United States Patent Office 3,094,478
Patented June 18, 1963

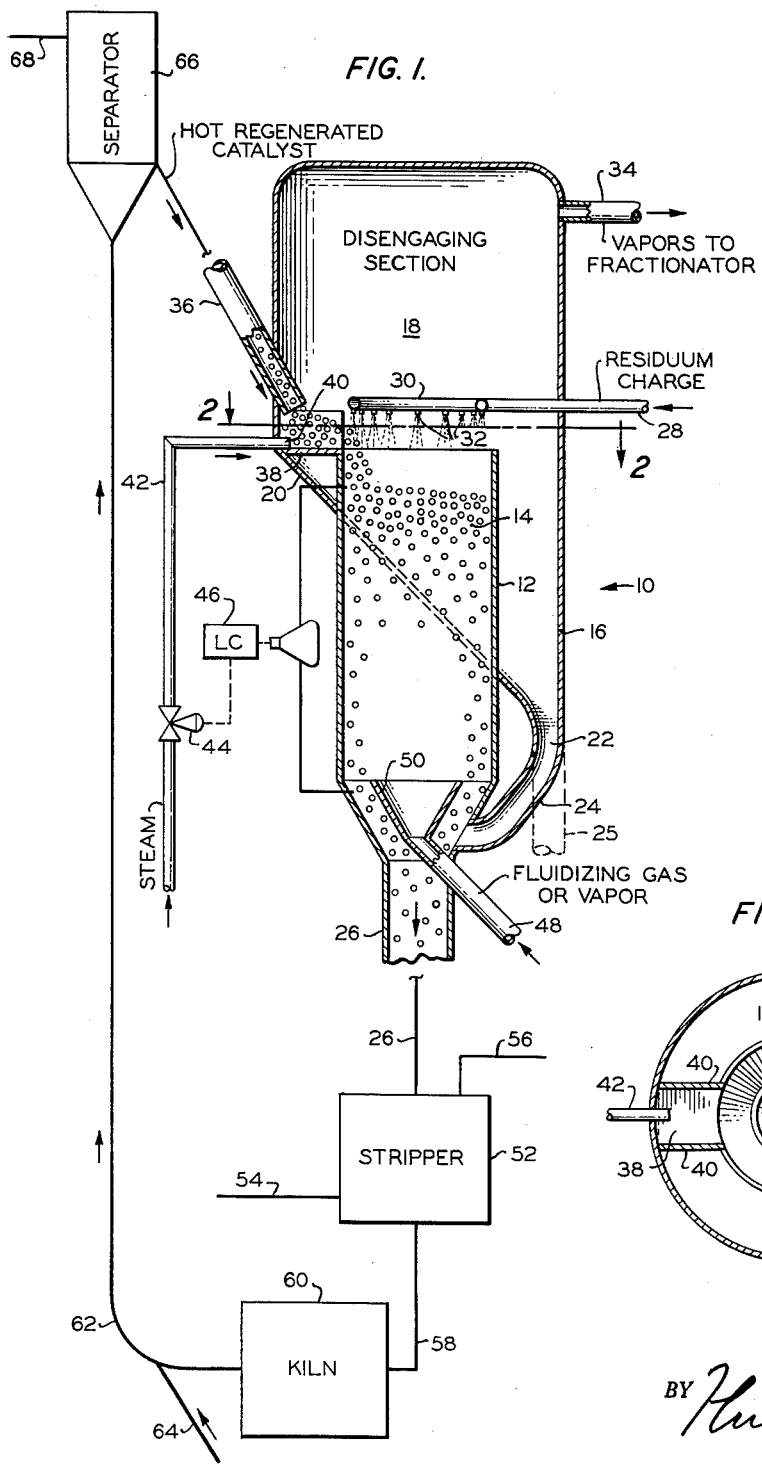

3,094,478
CATALYTIC CONVERSION PROCESS AND
APPARATUS
Kenneth A. Harper, Bartlesville, Okla., assignor to Phillips
Petroleum Company, a corporation of Delaware
Filed Oct. 3, 1955, Ser. No. 537,928
10 Claims. (Cl. 208—155)

This invention relates to a process and apparatus for the conversion of hydrocarbons in a bed of fluidized heat-exchange pellets.

Conventional processes employed for cracking or coking residual or heavy oils utilize a fluidized bed of solids ranging in size from about 30 to 400 mesh, or moving beds of bead or pelleted catalyst or solids. Such solids employed include inert materials, such as sand, clay, coke, etc., and the usual commercially available cracking catalysts. These heavy oils, processed in most cases, contain metals or metallic compounds which deposit on the solids during the cracking operation. Such deposits tend to decrease the activity of the cracking catalysts which, as is known, results in poorer quality and lower yield of cracked product. Additional contaminants are deposited on the catalysts during flow through the vessels, pipes, etc. One problem faced is the removal of these contaminants from the cracking operation, or at least minimizing the amount of such contaminants in the system.

Conventional means employed for removal of contaminants from the 30 to 400 mesh catalysts include treatment of the charge oil with catalyst fines prior to the oil being charged to the reactor, and the removal of part of the contaminated catalyst from the operation along with the addition to the system of fresh catalyst. Such conventional processes are obviously expensive and wasteful in that additional oil-contact apparatus is required and/or excessive loss of catalyst is realized.

The catalytic conversion of hydrocarbons, such as cracking, is also conventionally effected in fixed pellet beds by maintaining the catalyst pellets in the bed at a temperature in the conversion range and passing a stream of hot hydrocarbon through the catalyst bed. When converting hydrocarbons, particularly under cracking conditions, in this manner the coke deposited on the pellets in the bed is not uniformly deposited on the entire surface of the pellets because of the contacting of the pellets with each other and because of non-uniform flow of hydrocarbons through the bed, both of which result in the formation of agglomerates of coke and pellets so that during regeneration of the pellets by combustion of the coke, overheating of the pellets or portions of the pellets associated with large amounts of coke in the agglomerated material occurs.

I have devised an apparatus and process which facilitate the removal of contaminants, such as metals, from the surface of the catalytic pellets and render the surface thereof more active and which also effects a substantially uniform deposition of coke on the pellets, whereby the regeneration by burning off the coke without overheating the pellets is facilitated.

An object of the invention is to provide a process and apparatus for effecting the conversion of hydrocarbons to more desirable hydrocarbons in a fluidized bed of pellets. Another object is to provide a process and apparatus for effecting the conversion of hydrocarbons in a fluidized bed of pellets which removes from the pellets therein contaminants deposited thereon from the hydrocarbons, simultaneously with the conversion step. Another object is to provide a process and apparatus for cracking heavy hydrocarbons in contact with catalyst pellets which deposits coke evenly on the pellets to facilitate coke removal without overheating portions of the pellets and which maintains the surface of the pellets active for a longer period during the early phase of the contacting than is possible in a fixed bed process. Other objects of the invention will become apparent from a consideration of the accompanying disclosure.

The invention comprises maintaining a hot fluidized bed of pellets of a size in the range of about 4 to 10 mesh in a reaction zone maintained under reaction conditions and contacting the fluidized pellets with a hydrocarbon which is convertible to other hydrocarbons under the contacting conditions, removing pellets from the lower section of the bed, introducing pellets into the upper section of the bed, and collecting above the pellet bed hydrocarbon product from the conversion. The pellets are introduced to the upper section of the fluidized bed by delivering fresh pellets or pellets freshly regenerated (both of which are considered "fresh" pellets) to a receiving plate or zone adjacent the periphery of the conversion zone at the upper end thereof above the fluidized pellet bed from which position they are displaced or forced laterally toward the axis of the conversion zone or bed by an inwardly directed stream of gas delivered against the pellets in the receiving zone on the receiving plate. The pellets in the bed are fluidized by the injection of a fluidizing gas upwardly into the bottom or lower section of the bed at a rate sufficient to fluidize the pellets but insufficient to force a substantial amount or portion thereof out of the contacting zone or fluidized bed chamber.

The term "pellets" as utilized herein is intended to include any heat exchange material either catalytic or inert in the form of beads, tablets, cylindrical pills and pellets, spherical pellets, or units of regular or irregular shape of a size in the range of 4 to 10 mesh.

In my invention, employing fluidized pellets, preferably catalytic, of about 4 to 10 mesh, the contaminants deposited thereon are removed therefrom by attrition or wear of the solids surfaces, and the catalyst fines so produced, which fines contain the contaminants, are removed from the cracking process by way of a conventional elutriator vessel or stripper. Therefore, my system maintains a catalyst of high activity which produces a high quality and high yield of cracked product from the heavy oil charged without the necessity of intentionally disposing of a part of the "total" solids, and without the oil-solids pretreatment required in some conventional operations.

Furthermore, and importantly, I realize in my fluidized pellet operation, among other things, (a) an even distribution of heavy oil over the solids with substantially no "balling" or agglomeration of oil and catalyst which is encountered in the conventional moving bed process employing pellets; (b) effective and rapid exchange of heat between the solids and the oil; and (c) an even distribution of carbonaceous deposit or "coke" on the spent or used catalyst which is desirable for best results in catalyst regeneration.

A more complete understanding of the invention may be had by reference to the accompanying schematic drawing of which FIGURE 1 is an elevation, partly in section, of a preferred arrangement of the apparatus of the invention and FIGURE 2 is a horizontal cross section taken on the line 2—2 of FIGURE 1.

Referring to FIGURE 1, a reactor 10 comprises an inner fluidizing chamber 12, containing a fluidized bed of pellets 14, and a disengaging vessel 16 of larger cross sectional area than chamber 12 and surrounding at least the upper section of chamber 12 so as to provide a disengaging section or chamber 18. Inner chamber 12 and vessel 16 are preferably circular in transverse cross section. Chamber 12 may be flared upwardly in order to minimize jetting of solids from the upper end and facilitate control of the fluidization. More than one inner chamber 12 may be employed with different solids in each with different charge oils fed to each. The cracked effluents in this modification are taken off separately or together. The bottom 20 of vessel 16, outside and surrounding chamber 12, is oblique, sloping toward an outlet which is connected by a conduit 24 to the interior of the lower section of chamber 12 or alternatively to the conduit 26 leading from the bottom of contacting chamber 12. An alternative arrangement is to extend conduit 24 directly downward as shown by conduit 25 so as to recover fines directly from vessel 16 without mixing them with pellets in conduit 26. Alternatively, the shape of vessel 16 may be substantially the same as that of chamber 12 whereby the conical bottom of the vessel surrounds the conical bottom of chamber 12 in spaced apart relation thereto with openings into the bottom of chamber 12 or into conduit 26 for delivery of the fines collected from the disengaging section into outlet conduit 26.

Vessel 16 is provided with a hydrocarbon feed line or conduit 28 which connects with a feed distributing ring or header 30 which is provided with downwardly directed nozzles or openings 32 for injection of a fluid charge into the top of the pellet bed 14. A product effluent line 34 connects with the upper end section of the disengaging vessel for transfer of the hydrocarbon product to fractionators or other processing equipment, not shown. Fresh pellets are introduced to vessel 16 via conduit 36 which extends downwardly through the wall of the vessel to a position just above a pellet collection plate 38 which is provided with upright sides 40. The radial dimension of plate 38 and the spacing between chamber 12 and the wall of vessel 16 is sufficient to provide a static cone of pellets on the plate except when a stream of gas is directed against the pellets on the collecting plate. Gas for moving the pellets on plate 38 is supplied via line 42 in which is positioned a valve control means 44, such as a motor valve, which is operatively connected to a level controller 46 which in turn is sensitive to a solids level within chamber 12.

A conduit 48 extends into the lower section of vessel 12 and terminates therein in a funnel or conical shaped distributing member 50. Conduit 48 and distributor 50 function to introduce fluidizing gas or vapor into the bottom of vessel 12. The fluidizing gas may comprise any suitable inert gas, steam, hydrocarbon, etc.

Conduit 26 connects with a stripper 52 into which a stripping gas is introduced via line 54 and an effluent is withdrawn via line 56, carrying stripped hydrocarbon from the pellets together with fines carrying contaminants. The stripped pellets are passed via line 58 to a suitable regenerator or kiln 60 for conventional burning off of coke and/or other carbonaceous deposit from the pellets. The regenerated pellets are passed from kiln 60 into conduit 62 in which they are elevated by means of a lift gas introduced via line 64 to a gas solids separator 66 from which the gas egresses via line 68 and the recovered pellets gravitate through line 36 to the receiving plate 38.

In FIGURE 2 elements corresponding to those in FIGURE 1 are correspondingly numbered. In this figure the arrangement of receiving plate 38 in relation to injection conduit 42 is readily apparent. Conduit 36, not shown in FIGURE 2, is positioned directly above conduit 42 so that the pellets delivered to plate 38 are directly in front of conduit 42. Conduit 42 is shown extending a short distance into vessel 16 but it may be terminated at the wall of the vessel. Conduit 42 while shown contacting plate 38 may also be positioned above the plate a short distance. Receiving plate 38 may be rectangular in shape as shown in FIGURE 2 or it may be tapered with the narrow end adjacent vessel 12 if desired. It is also feasible to omit upright sides 40 providing the width of the plate circumferentially of the vessel is sufficient to provide ample room for support of the pellets delivered through conduit 42 without allowing same to pass over the edges of plate 38 into the annular space between the wall of vessel 16 and chamber 12.

In operation catalyst pellets from the regenerator are gravitated via line 36 onto receiving plate 38 from which they are displaced inwardly as required by injection of steam or other suitable displacing gas through line 42. Level controller 46 designed and set to maintain a desired level of solids in chamber 12 regulates flow control valve 44 so as to maintain the desired bed level in chamber 12. A flow control device (not shown), such as a pellet feeder of conventional construction, positioned in line 26 regulates the rate of flow of pellets from chamber 12 so as to control the amount of coke deposition on the pellets therein in known manner. The catalyst pellets in chamber 12 are maintained in a fluidized condition by means of the fluidizing gas introduced via line 48 and distributed by funnel 50. The hydrocarbon feed, such as a heavy oil feed, is sprayed via line 28 and distributing ring 30, preferably substantially preheated, onto the top of the fluidized bed which is maintained at sufficient temperature to effect the desired conversion or cracking of the hydrocarbon. Conversion or cracked products rise from the bed and the contacted solids travel downwardly and ultimately out of the vessel via line 26 for recycling as described above. The most easily cracked hydrocarbons are cracked in the upper part of bed 14 and pass therefrom into disengaging section 18 from which the fines settle out and are collected in the bottom of vessel 16 from which they travel through outlet 22 and conduit 24 to conduit 26 or alternatively through conduit 25 directly to disposal. The more difficultly cracked hydrocarbon components in the feed pass farther down into the bed where they, also, are cracked and the resulting lighter products likewise pass upwardly into disengaging section 18 from which all of the hydrocarbon vapors pass via line 34 to fractionation or other suitable treatment as required.

During the contacting, particularly in the upper section of bed 14, the maintenance of the pellets in fluidized form effects considerable contacting of one pellet with another and with substantial attrition thereof so that the outside surface of the pellets including deposits of contaminants such as metals deposited from the hydrocarbon feed or from transfer of the pellets through metal conduits and other apparatus elements is removed from the pellet surface and is recovered from disengaging section 18 to which the fines are carried. The contaminant-bearing fines are recovered from stripper 52 via line 56 and passed to gas solid separation means not shown. It is also feasible to recover the fines directly from outlet 22 via conduit 25 without passing the same into conduit 26.

The specific reaction conditions which may be utilized in the process depend upon the type of feed and the type of conversion desired and are well known in the art and do not form a part of the invention. While the invention is particularly suited to the cracking of heavy liquid hydrocarbons in the manner described, it is also suitable for effecting the conversion of various other types of hydrocarbons to more desirable forms by contacting the same with pellets in bed 14 either by introduction of the hydrocarbon to be converted through line 28 and/through line 48. Other hydrocarbon conversion processes to which the invention is applicable comprise dehydrogenation, hydrogenation, hydrocracking, and reforming.

Certain modifications of the invention will become apparent to those skilled in the art and the illustrative details disclosed are not to be construed as imposing unnecessary limitations on the invention.

I claim:
1. Apparatus for contacting fluids and solids comprising an upright fluidizing chamber having an open upper end and solids withdrawal means in the lower end; means for introducing fluidizing gas upwardly in the lower section of said chamber; a disengaging vessel of larger horizontal cross section than said chamber surrounding at least the upper end of said chamber and extending above same, said vessel having means for withdrawing solids from its lower section; a transverse solids receiving plate extending from the top edge of said chamber along a limited portion of the circumference of said edge laterally to the adjacent wall of said vessel and terminating adjacent said edge so as not to extend into said chamber; inlet conduit means for delivering solids onto said plate from a source outside of said vessel; gas injection means directed inwardly from the wall of said vessel along the upper surface of said plate directly below said inlet conduit means for moving solids across said plate into the top of said vessel; fluid outlet means from an upper section of said vessel; and means for introducing and distributing a fluid feed to the upper end of said chamber for contacting solids therein.

2. The apparatus of claim 1 including a flow control valve in said gas injection means; a level controller sensitive to a solids level in said chamber operatively connected to said valve.

3. The apparatus of claim 1 wherein said solids receiving plate is provided with upright sides to form a solids chute leading to said chamber.

4. The apparatus of claim 1 wherein the solids withdrawal means from said vessel comprises a solids outlet adjacent the wall thereof and the bottom of said vessel is oblique so as to slope toward said outlet.

5. The apparatus of claim 4 wherein said solids outlet is connected by conduit means with the solids withdrawal means from said chamber.

6. A process for producing cracked products from a heavy hydrocarbon feed which comprises maintaining a hot agitated bed of heat-exchange pellets in the range of about 4 to 10 mesh size in a restricted cracking zone at cracking temperature by injecting an agitating gas upwardly into the lower section of said bed; withdrawing pellets from the lower section of said bed and introducing fresh pellets onto the top layer of said bed by delivering same to a collecting zone above the top of said bed laterally outside thereof, and forcing said pellets laterally into the area above said bed with a laterally and inwardly directed stream of gas; introducing said feed in liquid form onto said top layer so that at least a portion thereof in liquid form passes downwardly in said bed with said pellets and so as to crack said feed and produce lighter hydrocarbons and coke on said pellets; and collecting said lighter hydrocarbons above said bed as product.

7. The process of claim 6 wherein coke deposited on said pellets by said cracking is removed from the pellets withdrawn from the lower section of said bed by combustion; and the pellets freed of coke are returned to said bed.

8. The process of claim 6 wherein the injected gas comprises steam.

9. The process of claim 6 wherein said pellets comprise a cracking catalyst.

10. The process for the conversion of hydrocarbons to more valuable hydrocarbons which comprises maintaining a hot dense agitated bed of catalyst pellets of about 4 to 10 mesh size in a conversion zone at reaction conditions for said hydrocarbons by passing an agitating gas upwardly thru said bed; introducing a liquid stream of convertible hydrocarbons onto said bed so as to effect conversion thereof to more desirable hydrocarbons; withdrawing pellets from the lower section of said conversion zone; introducing pellets onto the top of said bed by feeding same to a collection zone above and laterally outside of said bed and forcing said pellets laterally into an area above said bed by directing a stream of gas against the pellets in said collection zone and toward said conversion zone; and collecting said more desirable hydrocarbons above said bed as product.

References Cited in the file of this patent

UNITED STATES PATENTS

| | | |
|---|---|---|
| 2,337,684 | Scheineman | Dec. 28, 1943 |
| 2,511,463 | Claassen | June 13, 1950 |
| 2,684,867 | Berg | July 27, 1954 |
| 2,692,848 | Leffer | Oct. 26, 1954 |
| 2,789,082 | Barr et al. | Apr. 16, 1957 |
| 2,868,719 | Martin et al. | Jan. 13, 1959 |
| 2,911,355 | Ernst | Nov. 3, 1959 |
| 2,983,671 | Fogle | May 9, 1961 |

OTHER REFERENCES

Kelley: The Petroleum Engineer, September 1945, "Measurement of Solids in TCC Process," pages 136, 138, 142.